Dec. 22, 1970        A. G. CALEB        3,548,452

EXTRUSION APPARATUS FOR FABRICATING BUILDING UNITS

Filed Dec. 20, 1967        9 Sheets-Sheet 2

INVENTOR

Abram Godwin Caleb

BY Polachek & Saulsbury

ATTORNEYS

United States Patent Office 3,548,452
Patented Dec. 22, 1970

3,548,452
EXTRUSION APPARATUS FOR FABRICATING
BUILDING UNITS
Abram Godwin Caleb, 4 Caribbean Ave.,
Kingston, Jamaica, Bahamas
Filed Dec. 20, 1967, Ser. No. 692,066
Int. Cl. B29c 1/00
U.S. Cl. 18—5                                                2 Claims

ABSTRACT OF THE DISCLOSURE

Modular building units are described made of a thermo-setting mixture of materials. The units are formed in hydraulic presses having heated walls. An extrusion press, hinged book type of press and a slidable book-end type of press are described. The presses have retractable cores which form channels in the building units. The building units may serve as columns, posts, outside and inside walls, ceilings, roofs, and floors.

---

The present invention relates to a means for fabricating a housing unit.

Climatic conditions and available materials usually determine the type of construction of buildings. In cold regions of the world, buildings are often of wood construction and are finished with exterior cladding and siding, paper wrap, stud walls between wall insulation, interior furring, plaster or dry wall tape, priming and paint. In tropical regions, the conventional method is to use cut stone or cement blocks set in mortar, with bolts, columns and lintels of cast concrete, requiring extensive use of lumber for form work, steel for reinforcing, and expensive labour for chipping rough casting and finishing. This expensive method is still more costly because it is further necessary to provide steel strengthening members and stabilizing supports to reduce the chances of a building collapsing, especially in the event of earth tremors or hurricanes.

Roofing in wood construction of buildings is usually of inflammable woods, covered with shingles and are susceptible to fire, weather and vermin. In tropical regions roofing is usually of metal or concrete and gives no protection inside a building to the hot climate.

An object of the present invention is to provide a means for fabricating a module section of greater height than width, suitable for use with other similar module sections for rapidly constructing a housing unit in which at least some of the above disadvantages are reduced.

According to the present invention there is provided a method of fabricating a housing unit by charging a mould of a press with a composition and compressing the composition until the composition fills the mould. Preferably the composition includes bagasse, gypsum and resin.

Module sections and panels which have cored portions can be formed in novel hydraulic book presses having thermal walls. The book presses can have hinged or slidable walls. No special pressure moulds are necessary. The book presses form strong cored panels and sections faster and cheaper than is possible with conventional bed presses, and they are particularly well adapted for forming panels from crushed stone, bagasse and resin.

One form of thermal wall vertical book press employs hinged collapsible core forming sections standing vertical in the press and secured to a bed plate by activating shafts and cams. The side walls of the press are heavy steam jacketed steel plates having tongue and groove forming features in either wall. These sides of the walls are wedge shaped to form reinforcing structures for the hinged walls. The sides extend further in the form of saddles for the closing bell cranks. In essence the action is as follows: The heated coring sections stand in the cavity of the opened press centered between sides and ends. The side walls are hinged at about center. The cam slot at the top of the press provides a large opening at the top for ease of dump loading. When open the cavity resembles a rough diamond wider at the top. To close the press, hydraulic cylinders acting through the bell cranks move the hinged walls in as the wall close impacting the material more and more. The cranks moving into a flatter plane, begin to multiply the hydraulic force. As the walls close the greater impaction necessitates greater force to continue the closing action of the walls, but at the same time as the walls close the planes of the hinged bell cranks change to higher and higher multiplications compensating for the increasing resistance of the material being impacted, and overcoming it with ever increasing force.

In this manner thermal wall hydraulically cranked book press can exert tremendous force on material at a fraction of the cost, faster, in a more compact machine than a conventional straight hydraulic press. When the book press is fully closed to the tolerances for a specific thickness of the panel the material fills all voids and cavities forming around the coring sections and into the fluted tongue and groove at the sides. Due to the greater infolding of the center the panel is stronger and almost pre-stressed by the very nature of its formation.

After the press is closed the bottom is rammed up, then the top is rammed down to bring the material to exact dimensions. The whole action takes but seconds and since the press is heated the thermal resins bond the material. The rapid compressive infolding of the material generates great heat to permeate the normally insulative material resulting in internal hard formations not obtained by any other method.

The special coring sections are then collapsed and the panel is internally jet cooled. Then the press is opened to release the panel which is lifted out and removed on a gantry. For a multiple press operation, the gantry connects all presses so the operation is continuous. The materials produced in these presses have been tested and proven superior to most building materials now being used. As regards price, construction costs, time and ease of assembly, flame resistance, insulation value, water resistance, vermin resistance, load, bearing and span, stability in dry and humid conditions and durability of finishes. The panels can accept any finish—mortar, plaster, paint or lamination of wood, metal, plastics or ceramics. The materials can be etched in the forming molds to produce effects such as brick, fieldstone, shingling, sidings or special effects. The elasticity of the material makes reinforcing unnecessary because of the nature of the formation. This cored, light, strong building module produces the optimum in wall sections, partitions, roofing sections, corner elements, top and bottom plates, doors lintels, joists and beams and floor slabs, in fact, every major element needed to assemble a house. This section is of greater height than width than building blocks and can never be confused with or likened to building blocks.

By pre-engineering and exploiting all the advantages inherent in the concept of the full section module, all the service necessities can be implemented through in-plant-installation at a lower cost, as opposed to on site electrical, plumbing, tiling, painting etc. When added to the other savings, the total value of package becomes large enough to easily offset transportation and handling costs of modular units. This would be in keeping with the concept of "the act of assembly constitutes the housing unit." Unlike other so-called prefabricated sections which are either partially constructed or laboriously cast in heavy mortar or concrete, this product is mass produced to exacting specifications in equipment specially designed for the purpose.

The resultant product has been tested as to the properties before mentioned and possesses them all, and in addition can be produced and marketed so as to enable the assembly of quality homes faster and at much lower cost.

It should be noted and emphasized that the building units and modules referred to herein are not blocks. They are not used in a building process wherein bits and pieces are stacked and interfitted and held together by mortar. On the contrary they have the elongated forms of panels, columns, beams and the like and are used in assembling a building structure in large sections rather than building it piecemeal.

The invention provides the means of solving a critical problem of proving good housing at relatively low cost. For a specified cost, in most cases, the invention provides better looking, utilitarian, safer, more comfortable and more lasting homes.

The modular units are formed from materials selected according to functions to be performed by the finished units. Bagasse or cellulose material, calcined gypsum, limestone, calcium bicarbonate, and thermosetting resins are some of the material which will be used.

The presses in which the materials are processed employ massive, hinged bell crank levers to move, control and effect compaction of the materials. As many bell crank assemblies as desired may be provided at each side of a press, depending on the size of modular unit to be formed therein.

For further comprehension of the invention, and of the objects and advantages thereof, reference will be had to the following description and accompanying drawings and to the appended claims in which the various novel features of the invention are more particularly set forth.

In the accompanying drawings forming a material part of this disclosure:

FIG. 6 is a view similar to a portion of FIG. 5, the press being shown closed.

Figure 1:
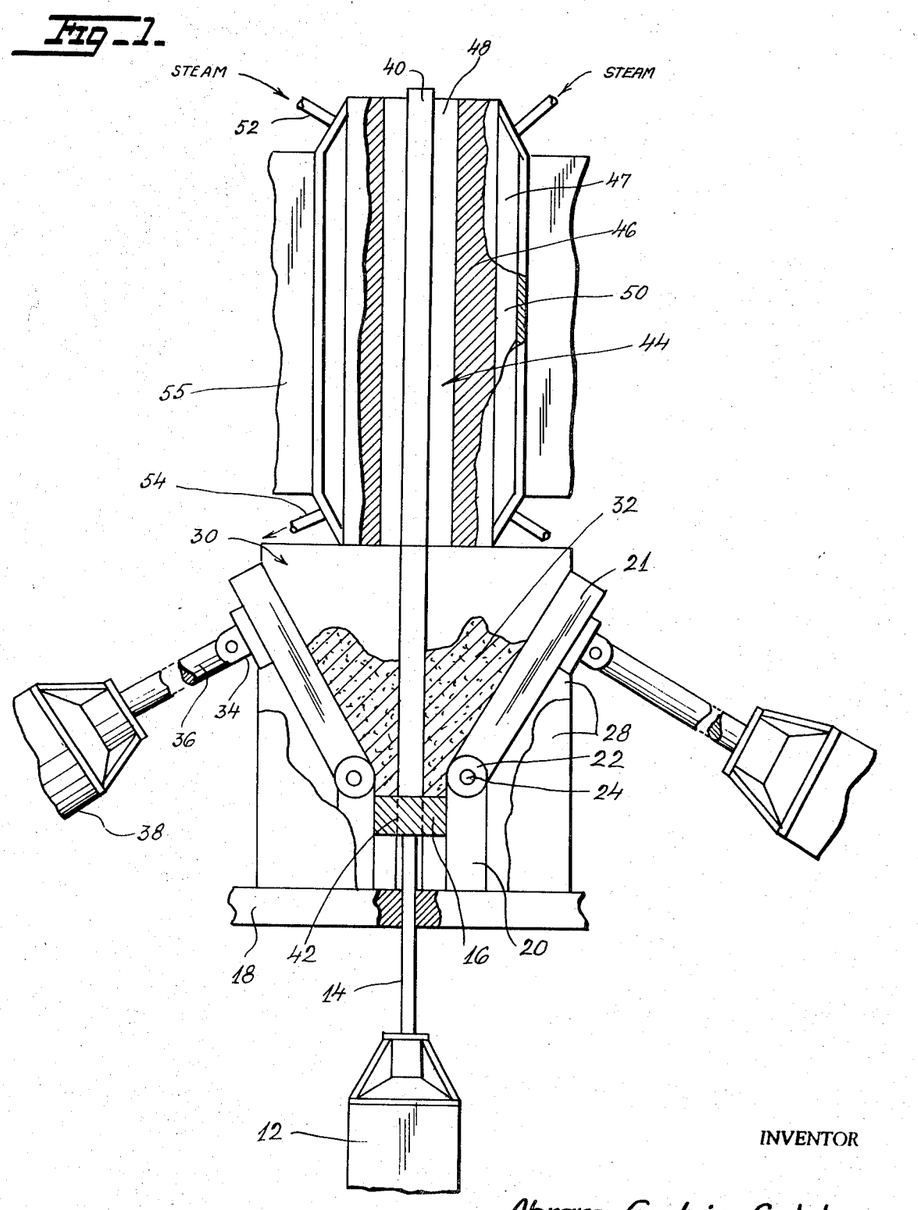
FIG. 1 is a diagrammatic side view partially in section and with parts broken away showing an extrusion type of press for making modular units according to the invention, the press being shown open.
Figures 2, 3, 4, 11:
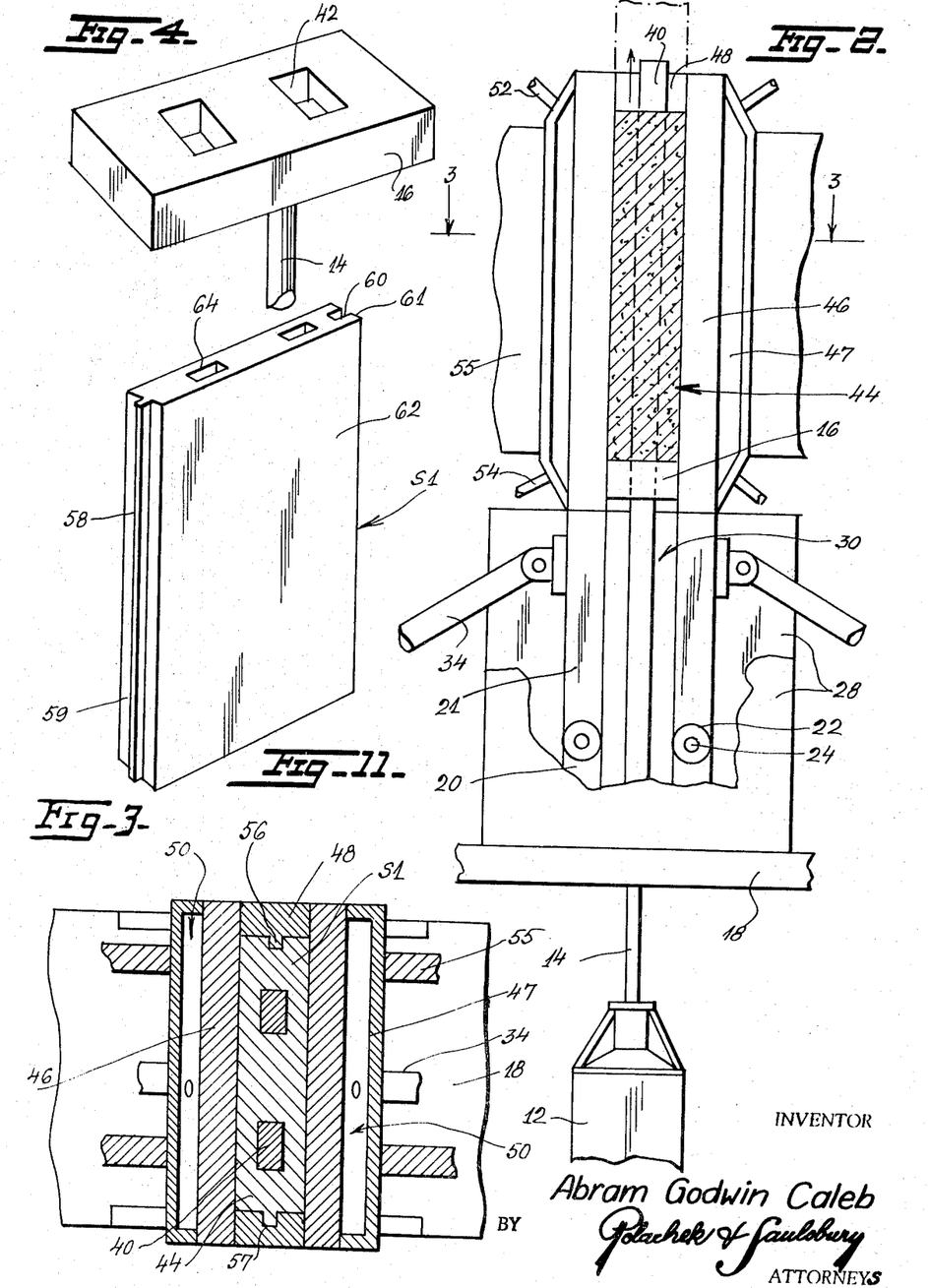
FIG. 2 is a view similar to FIG. 1 with press shown closed.
FIG. 3 is a cross sectional view taken on line 3—3 of FIG. 2.
FIG. 4 is a fragmentary perspective view of a ram head employed in the press of FIGS. 1–3.
FIGS. 11, 12, 13 and 14 are perspective views of modular panels made by presses such as shown in FIGS. 1, 5 and 8.

FIGS. 1, 2 and 3 show an extrusion press 10 having a hydraulic ram 12 mounted in an axially vertical stationary position. The ram has an axially vertical piston shaft 14 which moves vertically and carries a generally rectangular piston head 16; FIG. 4. The piston passes through a stationary base plate 18 on which are two upstanding parallel walls 20 which serve as guides for the piston head 16. Hinged to walls 20 are walls 21. At upper ends of walls 20 are bearings 22 in which are axially horizontal shafts 24 connected to lower ends of walls 21. On the base plate 18 are two vertical side walls 28 between which walls 21 are pivotable. Walls 21 and 28 define a generally V-shaped cavity 30 closed at the bottom by piston head 16. Cavity 30 can be filled with a viscous mass of material 32 to be formed into a modular building section in the press.

The walls 21 are provided with brackets 34 at their outer sides to which are pivotally joined outer ends of shafts 36 of two laterally spaced hydraulic rams 38. Mounted on base plate 18 is a plurality of coplanar, rigid, stationary cores 40 disposed vertically and passing through holes 42 formed in the piston head 16. The cores are centered in a heating and forming chamber 44 defined between two vertical spaced parallel walls 46 joined by vertical end walls 48. Chamber 44 is open at the top. Each of walls 46 has a rather wedge shaped hollow structure 47 formed thereon in which is a steam chamber 50. The chambers 50 are provided with steam which can be superheated. The steam can be supplied via inlet pipes 52 at upper sides of the wall structure 47 and leaves via outlet pipes 54 at lower ends of the wall structure. Stationary supports 55 are provided for the walls 48 and their associated steam chambers. End walls 48 may have tongue and groove portions 56, 57 extending the full lengths of these walls; see FIG. 3.

In operation of press 10, a mixture of suitable material which is thermosetting is deposited in cavity 30 while the walls are open as shown in FIG. 1. Then the walls 21 are pivoted inwardly by pistons or rams 38. This fills all voids and spaces in cavity 30 and around cores 40. After walls 21 are closed the hydraulic ram 12 forces the ram head 16 upwardly to the position shown in FIG. 2 at the bottom of chamber 44. This chamber is heated by hot walls 46 which in turn are heated by steam in the steam chambers 50. The heated mixture in the chamber 44 hardens due to the setting of the resins in the mass 32 to form a modular building panel, unit or section S1. Repeated cycles of the press force more and more material into impaction chamber 44 and in so doing cause continuous extrusion of a cored building element from the mouth of the press as indicated by dot-dash lines in FIG. 3. This press is especially adapted for forming hard bonded elements in long shapes.

FIG. 11 shows modular building element S1 such as made by use of press 10. The element is a long flat panel which is longer than it is wide. It has a tongue 58 extending the full length of one edge 59 and a groove 60 extending the full length of opposite edge 61. Opposite sides 62 of the panel are flat. Channels 64 extend the full length of the panel. The panel has a rigid, highly compacted body particularly well adapted for forming entire walls or parts of walls of buildings such as homes, stores, and the like. Other forms of modular building elements which can be made with press 10 are described below in connection with FIGS. 12–23.

Figures 5, 7:
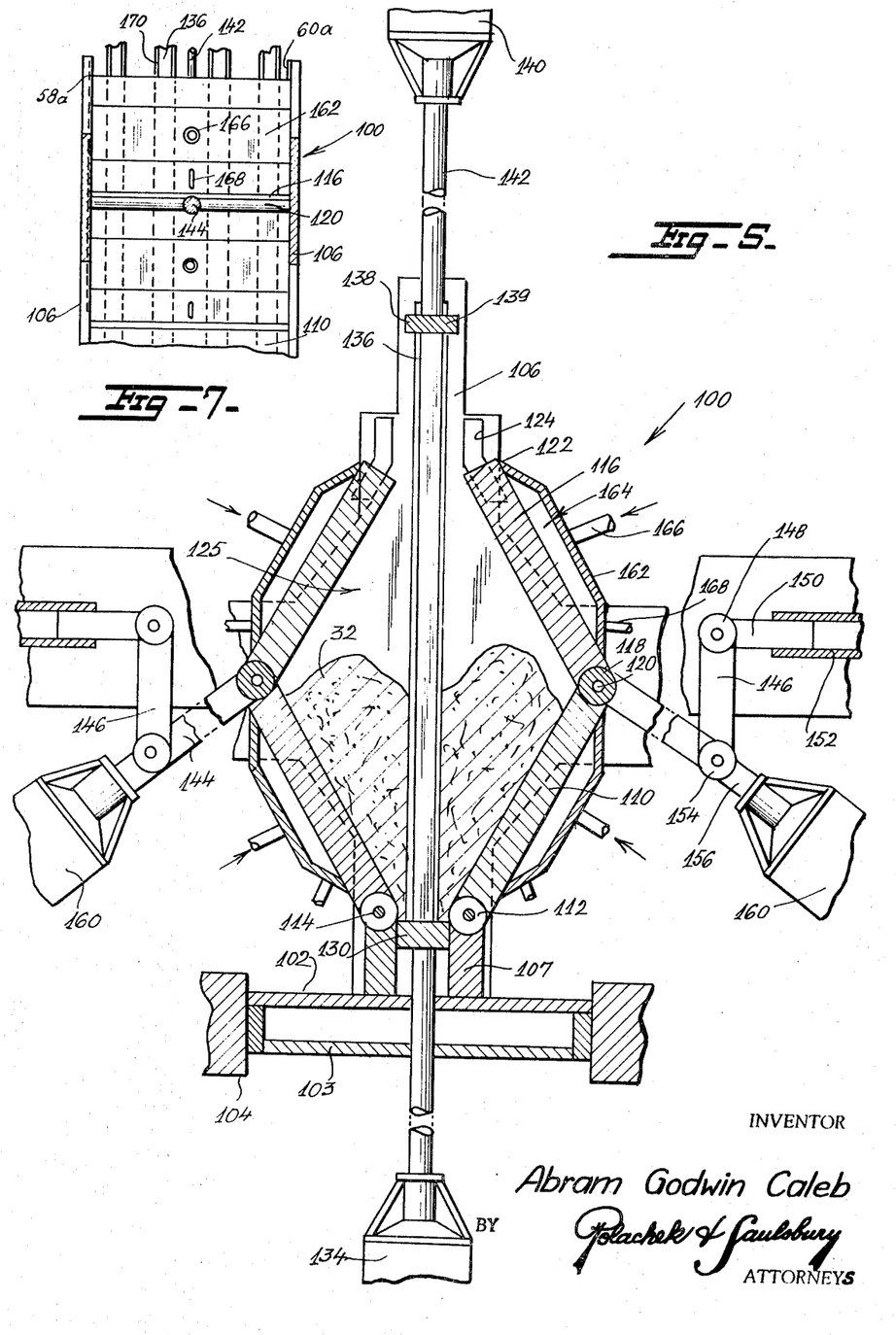
FIG. 5 is a diagrammatic side view partially in section of a book press with hinged walls, parts being broken away, the press being shown in open position.
FIG. 7 is a fragmentary vertical sectional view taken on line 7—7 of FIG. 6.

FIGS. 5, 6 and 7 show a hinged book type of press 100 which has a base plate 102 carried by stationary supports 104. On the supports are two spaced vertical side walls 106. Two short vertical walls 107 on plate 102 between walls 106 are stationary and pivotally support two walls 110. Lower ends of walls 110 are engaged by bearings 112 and shafts 114 to upper ends of walls 107. Upper ends of walls 110 are pivotally engaged with lower ends of two other walls 116 by bearings 118 and shafts 120. Upper ends of walls 116 have lateral pins 122 engaged in grooves 124 in inner facing sides of walls 106. The walls 106, 110 and 116 define a chamber 125 open at the top. The chamber is rather diamond shaped in vertical section and is closed at the bottom end by a rectangular ram head 130. This ram head is supported by a piston shaft 132 carried by stationary axially vertical hydraulic ram 134. The shaft 132 extends through aligned openings in base plate 102 and underlying reinforcing plate 103. Mounted on head 130 and extending upwardly centrally of the chamber 125 between the pivotable walls are vertical core members 136. The core members extend in openings 139 in head 138 of another ram 140. When the piston head 130 is fully retracted, the core members 136 are fully retracted from ram head 138. Ram head 138 is carried by axially vertical piston shaft 142.

Joined pivotally to each of the cross shafts 120 is a lever 144 forming part of a bell crank lever assembly 144, 146. Lever 146 is pivotally connected by a joint 148 to a guide bar 150 engaged slidably between guide plates 152. The guide plates are carried by walls 106. Levers 144, 146 are pivotally connected together by a joint 154 to piston 156 of a ram 160. Two similar rams 160 and lever assemblies 144, 146 are provided at opposite sides of the press. Wall structures 162 on outer sides of walls 110, 116 defiine steam chambers 164 supplied with steam via inlet pipes 166. The steam is exhausted via outlet pipes 168.

In operation of press 100, the viscous mixture 32' of thermosetting material is inserted into the chamber 125 through its open top. The walls are separated as shown in FIG. 5. Then the rams 160 close the walls 110, 116 by moving them inwardly to reduce chamber 125 in size. The material is compacted and heated. Before the material sets, ram head 130 is advanced upwardly to insure proper compaction and precise formation of the bottom end of the modular building section S2 formed in the press as indicated in FIG. 6. Ram head 138 is advanced downwardly by ram 140 to compact the upper edge of the modular building section. After the material sets, the ram head 130 along with cores 136 are retracted. The ram head disengages from section S2 and cores 136 disengage from ram head 138. The ram head 138 is then retracted upwardly by ram clear of section S2 which can then be lifted by suitable gantry (not shwon) out of the open upper end of chamber 125. The section S2 will slide off of vertical cores 136 as the section is removed.

In press 100 the action of heads 130, 138 insures maximum compaction of material 32'. The bell crank action of the lever assemblies actuated by lateral rams 160 makes it possible to form panels having a higher degree of compaction than is possible with the extrusion press 10.

Figures 9, 12, 15, 16, 17:
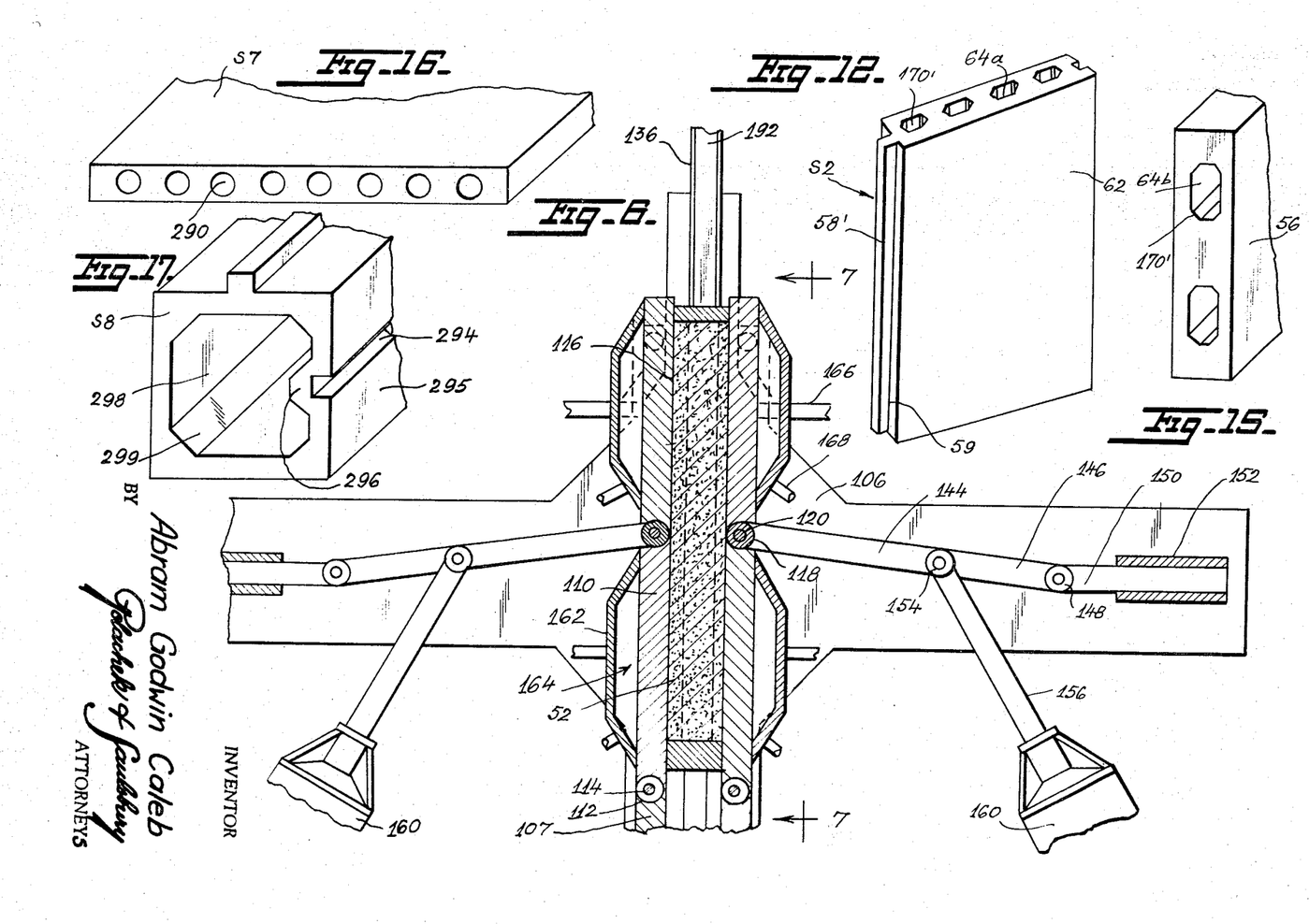
FIGS. 15, 16 and 17 are fragmentary isometric views of modular sections made by presses such as shown in FIGS. 1, 5 and 8.

FIG. 12 shows modular building section S2 such as made with press 100. Parts corresponding to section S1 of FIG. 11 are identically numbered. Section S2 can be made with press 10. Press 100 will be preferred however if a very dense body structure is required or if material 32' requires very large compaction force. Cores 136 of press have bevel corners 170. Thus the channels 64a in section S2 have corresponding corners 170'. The tongue and groove 58', 60' of section S2 are formed by a corresponding mating groove and tongue 58a, 60a on inner sides of walls 106; FIG. 7.

Figure 13:
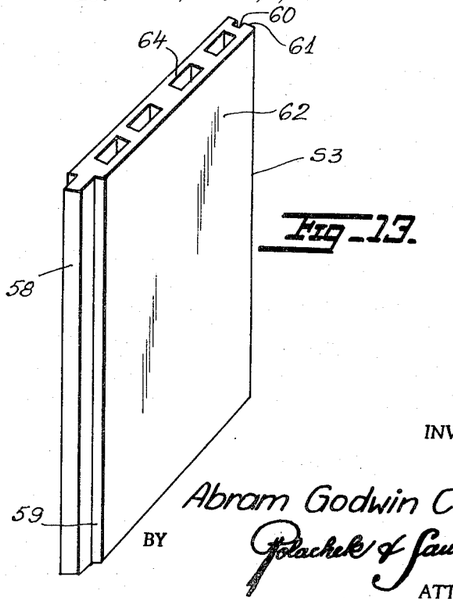

FIG. 13 shows another modular building section S3 which can be made by presses 10 or 100. Parts corresponding to those of section S1 and S2 in FIGS. 11, 12 are identically numbered. The channels 64 in section S3 are rectangular like those in section S1. Four channels are shown but more or less channels can be provided depending on the width of the section. Sections S1–S3 are particularly well adapted for forming building walls or partitions. The tongue and groove structures enable panels to fit into each other at their edges for forming tight seams.

Figure 14:
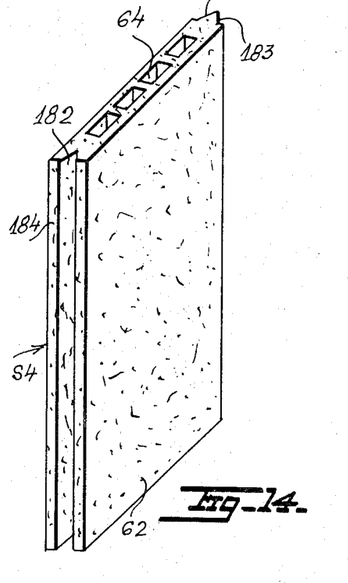
Figures 18, 19, 20:
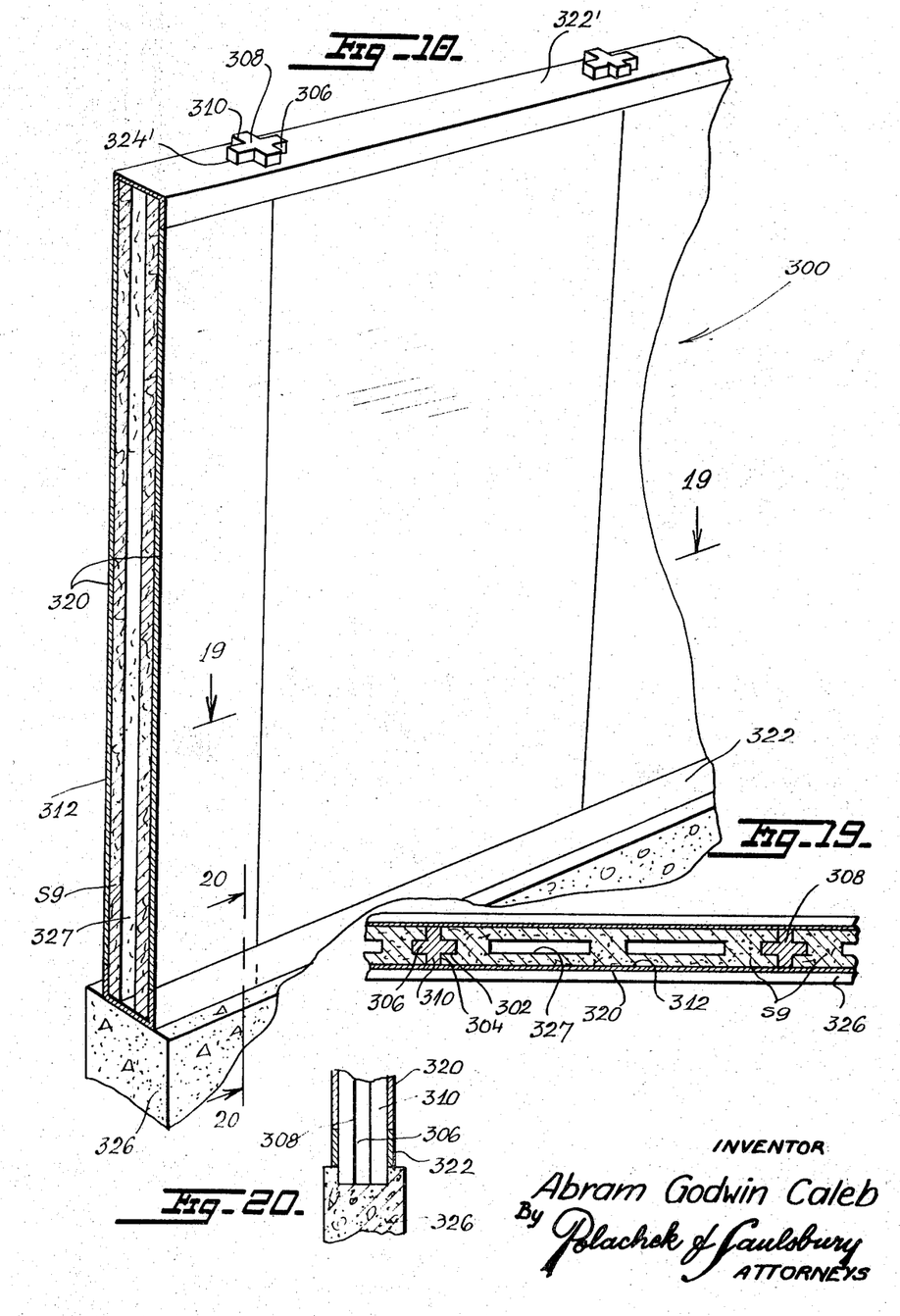
FIG. 18 is an isometric view with parts broken away of a wall structure employing modular sections according to the invention.
FIGS. 19 and 20 are fragmentary sectional views taken on lines 19—19 and 20—20 respectively of FIG. 18.
Figure 21:
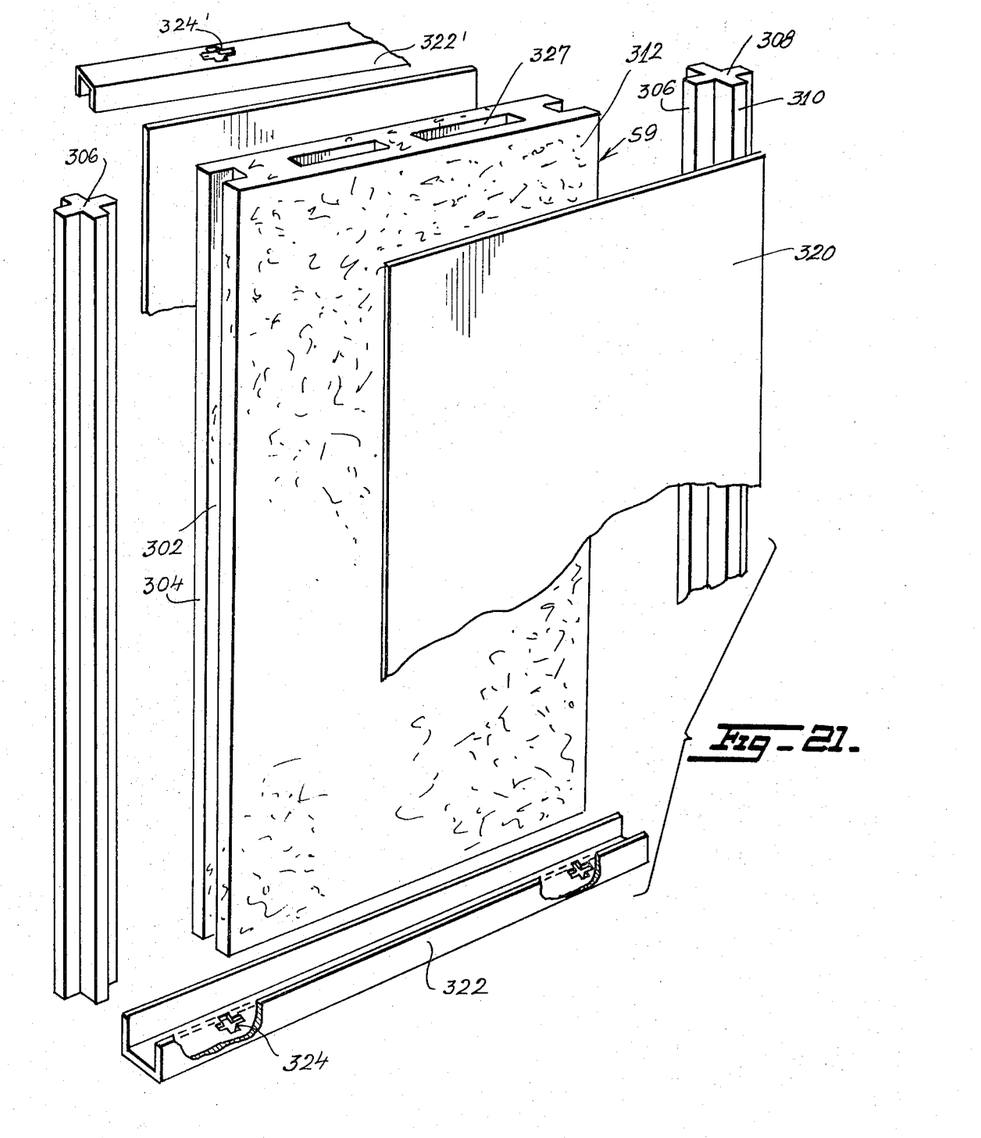
FIG. 21 is an exploded perspective view of parts of the wall structure of FIG. 18, portions being broken away or omitted.

FIG. 14 shows a modular section S4 which can also be made by presses 10 or 100. Wedge shaped tongue 180 and groove 182 are formed at opposite edges 183, 184. The section has rectangular parallel channels 64. This section is particularly well adapted to serve as a roof or ceiling panel, although it could serve as a wall panel or partition.

Figures 8, 9:
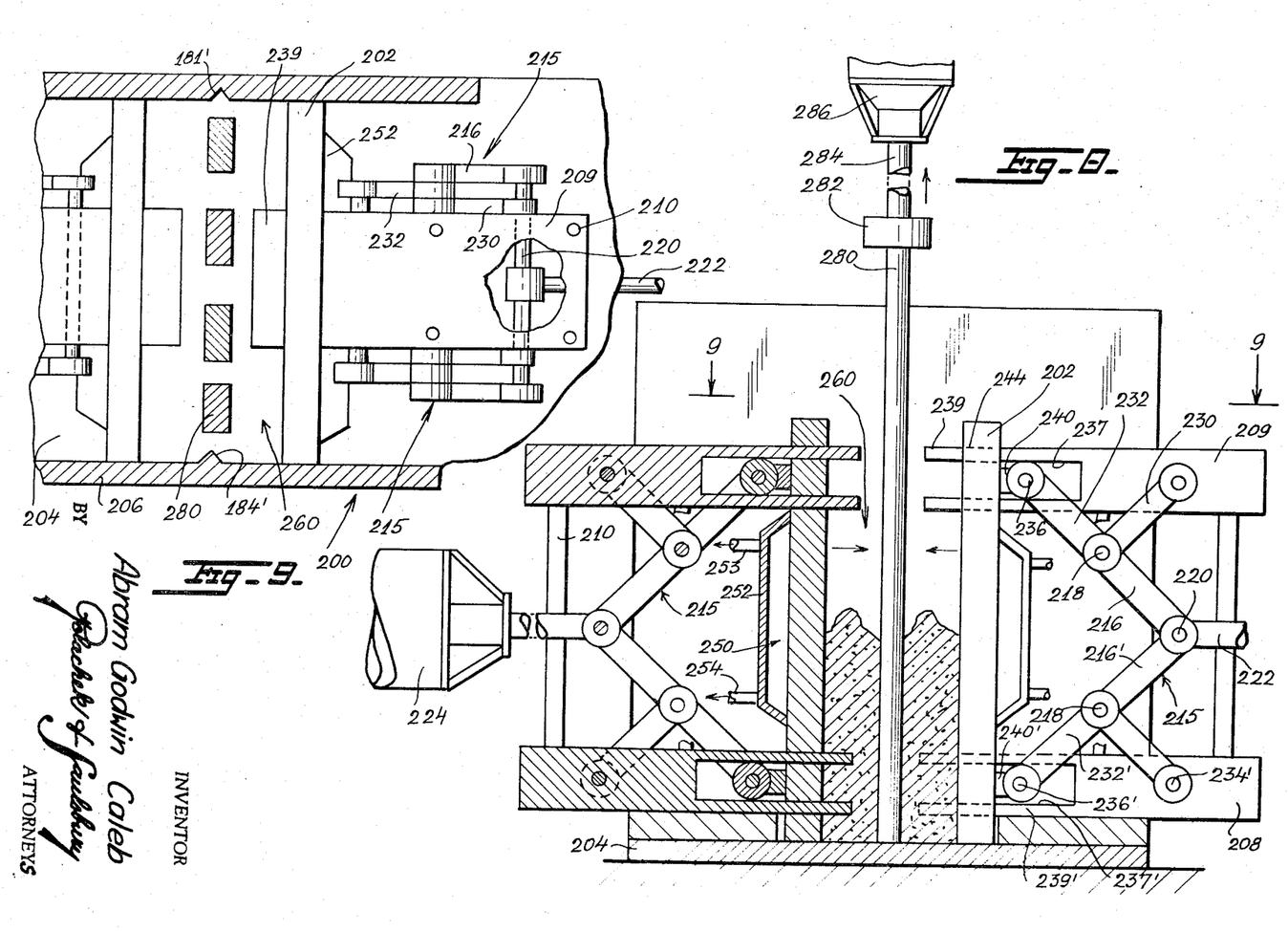
FIG. 8 is a diagrammatic side view partially in section of a book end press with slidable walls, parts being broken away, the press being shown open.
FIG. 9 is a fragmentary sectional view taken on line 9—9 of FIG. 8.
Figure 10:
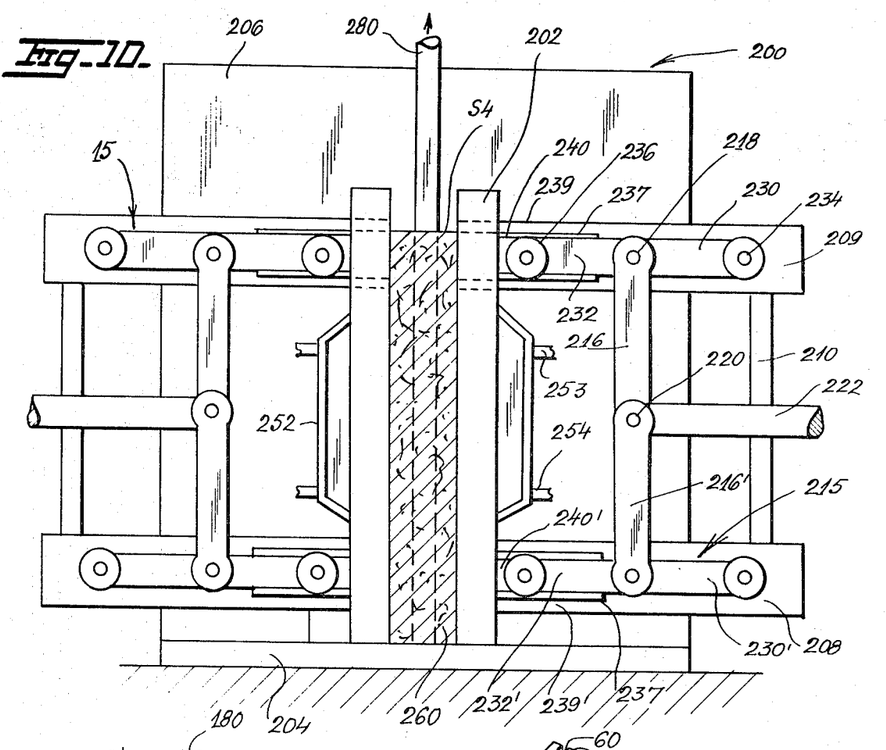
FIG. 10 is a view similar to part of FIG. 8, the press being shown closed.

FIGS. 8, 9 and 10 show a book end type of press 200 which provides still more compressive force than is possible with presses 10 and 100. In press 200, two massive vertical walls 202 are disposed parallel to each other on base plate 204. The walls 202 are disposed parallel to each other on base plate 204. The walls 202 are slidable horizontally toward and away from each other between stationary vertical end walls 206 disposed on base plate 204. Lower horizontal guide plates 208 are mounted on base plate 204. Upper horizontal guide plates 209 are supported by posts 210 on plates 208. The press has four hinged lever assemblies 215. Each lever assembly 215 includes a lever 216 and a lever 216' pivotally engaged with cross shaft 220. Cross shaft 220 is secured to ram shaft 222 driven horizontally by one of two rams 224 at opposite ends of the press. The upper end of lever 216 is pivotally secured by a joint 218 to two levers 230, 232. The upper end of lever 230 is pivotally secured by joint 234 to guide plate 209. The upper end of lever 232 is engaged pivotally with a joint 236 connected to a pusher bar 240 which moves horizontally in a cavity 237 between sections 239 of guide plate 209. Bar 240 is joined to the outer side of wall 202. Lever 216' is pivotally joined at its lower end by joint 218' to two levers 230', 232', in an arrangement similar to that of levers 230, 232. The lower end of lever 230' is pivotally engaged by joint 234ʺ to guide plate 208. The lower end of lever 232' is pivotally engaged with pusher bar 240' which moves in cavity 237' between sections 239' of guide plate 208. Slots 244 are provided in walls 202 through which the plate sections 239, 239' extend. Steam chambers 250 are defined by outer wall structures 252. These wall structures have steam inlet pipes 253 and outlet pipes 254. A chamber 260 to receive the unset mixture 32ʺ is defined between walls 206 and walls 202. Core members 280 are vertically disposed in the chamber 260. These core members are joined at their upper ends to a cross head 282 carried by shaft 284 of a ram 286. The core members can be retracted out of chamber 260 after the mixture 32ʺ has set.

It will be noted that there is a pair of triple bell crank assemblies 215 at each corner of the press. This arrangement provides maximum impaction to the mixture in forming modular building sections, with less hydraulical force exerted than is required in conventional presses. The unset material 32ʺ is dumped into the open top of chamber 260. The press is then closed as shown in FIG. 10. Levers 230, 232 and 230', 232' assume aligned horizontal positions while levers 216, 216' assume vertical positions. The great pressure exerted due to the triple leverage of each set of levers insures that all voids in the chamber 260 are filled. The walls 202 are steam heated and the mixture 32ʺ sets to form a very dense, strong building section. After the mixture 32ʺ sets, the walls 202 are retracted by reversing the drive of shafts 222 by rams 224. The core members are retracted by drawing them upward by means of ram 286. This releases the section S4 which can then be removed from the press through the open top of chamber 250. The wedge shaped tongue and groove 182, 184 of section S4 shown in FIG. 14 are formed by groove 182' and tongue 184' on walls 206 of press 200.

Press 200 can be used to make any one of sections S1–S4 shown in FIGS. 11–14 if very strong, highly compacted modular building units or elements are required. In addition the press can be used to make sections such as sections S6, S7 and S8 shown in FIGS. 15, 16 and 17.

Section S6 shown in FIG. 15 can be used as a joist, beam, lintel, plate, and the like. It is thicker and narrower than any of the thinner and wider panels or sections S1–S4. It has two channels 64b formed with beveled corners 170''.

Section S7 shown in FIG. 16 can be used like lumber for doors, partitions and the like. It has cylindrical parallel channels 290 which are formed by employing cylindrical core members in the press 10, 100 or 200.

Section S8 shown in FIG. 17 can be used as a corner column beam, and the like. It has a ridge or tongue 292 at one side 293 and a groove 294 at adjacent side 295. A reinforcing ridge 296 is formed inside of channel 298 which is generally rectangular in cross section, but with reinforced beveled corners 299.

FIGS. 18–21 show a building wall structure 300 which can be made by use of a plurality of similar modular sections or panels S9. Each panel is formed in a press like any of presses 10, 100 and 200 described above. Each section S9 has grooves 302 formed at opposite edges 304. These grooves engage with tongues 306 of studs 308 which are cross shaped. Edges 304 abut lateral tongues 310 of the studs. The outer sides 312 of the sections S9 are covered with any suitable sheeting or coating 320. Bottom ends of the panels are seated in a channel shaped molding 322 which has cross shaped holes 324. Lower ends of the studs extend through holes 324 and are embedded in concrete footing 326. Upper ends of the studs extend through cross shaped holes 324' in upper channel shaped molding 322' which overlays the upper ends of the panels. The wall structure is very quickly assembled. It is economical to build and can be used as in inner or outer wall of a building depending on the finish of the outer and inner sides of the panels. Channels 327 can be provided in the panels if desired.

Figure 22:
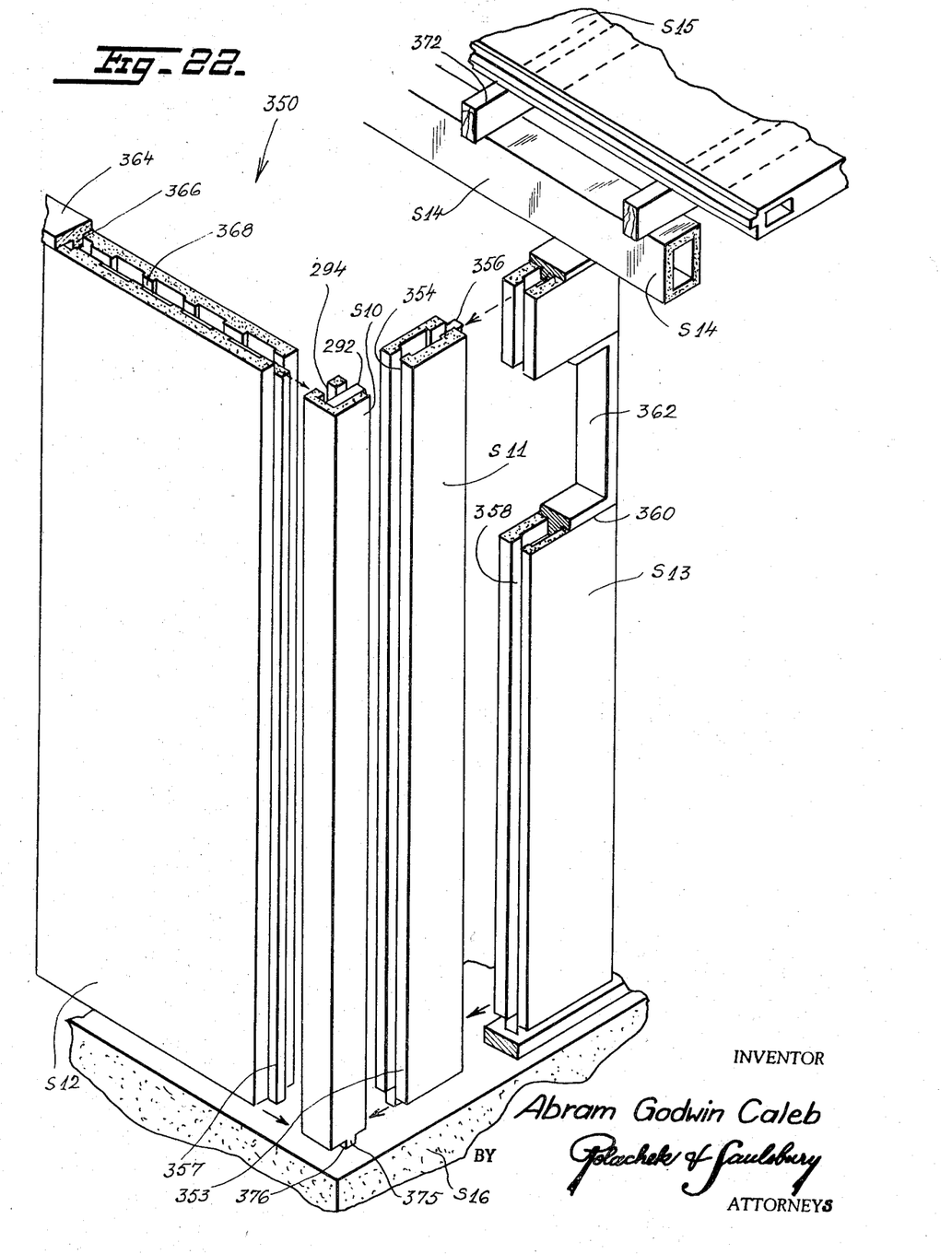
FIG. 22 is an exploded isometric view partially in section of another wall structure employing modular units according to the invention, portions being broken away or omitted.

Parts of another building structure 350 are shown in FIG. 22. Each corner post or column S10 may be similar in structure to section S8 of FIG. 17. It has a tongue 292 which interlocks with groove 354 in edge 353 of narrow panel S11. Panel S12 has tongue 357 which enters groove 294 in post S10. Tongue 356 of panel S11 engages in groove 358 of panel S13 which may have window opening 360 lined by frame 362. T-shaped plates 364 overlay all panels and posts with depending tongues 366 engaged in top grooves 368. Hollow beam sections S14 overlay plates 364. On these beams are rafters 372. Roof panels S15 overlay the rafters. All vertical sections of structure 350 are supported by a base slab section S16. Tongues 375 at lower ends of the vertical sections extend into corresponding openings 376 in the slab.

All of the sections S1–S16 can be made by the presses 10, 100 or 200 depending on the size, strength and form required. The modular sections can be quickly and cheaply assembled to form walls, floors, roofs of building structures on-site or off-set. It will be understood that the modular units described are not like building blocks which must be piled one on the other, interfitted and secured together by mortar. The panel sections will extend the full height of a wall; and one, two or more such panel sections can form the entire wall of a room depending on dimensions.

A particularly advantageous feature of the invention is that the modular sections can be made at high speed and low cost by gangs of presses 10, 100 or 200 set up to work simultaneously. While it is contemplated that the mixtures will use low cost materials such as bagasse, resin and gypsum, other suitable equally cheap and readily available materials can be used.

While I have illustrated and described the preferred embodiments of my invention, it is to be understood that I do not limit myself to the precise constructions herein disclosed and that various changes and modifications may be made within the scope of the invention as defined in the appended claims.

What is claimed is:

1. A press for the fabricating modular building units, comprising a pair of vertically-spaced walls, a pair of spaced movable walls defining a cavity with an open top for containing a mass of viscous thermosetting material, means for moving said movable walls together to constrict the cavity and the material therein to the form of a building unit, means for heating the constricted mass of material to set the same, at least one core member extending vertically through said cavity, means for retracting said core member from the set material, a hydraulic ram disposed below the movable walls, a horizontal ram head carried by the ram and driven upwardly by said ram for compacting the material at the bottom of said cavity and for moving the compacted material upwardly out of said cavity, spaced stationary walls disposed above said movable walls and defining a chamber with open top and bottom for receiving compacting material from said cavity, said heating means comprising steam heating chambers on said stationary walls, whereby set material constituting a building unit will be extruded upwardly out of said chamber as newly compacted material is driven upwardly out of said cavity into said chamber.

2. A press as defined by claim 1, wherein said movable walls are pivotally mounted to turn in a vertical plane, said cavity being generally V-shaped in vertical section with an open bottom through which said ram head enters, and said means for moxing the movable walls comprising other hydraulic rams having pistons connected to said movable walls.

References Cited

UNITED STATES PATENTS

| 1,578,103 | 3/1926 | Suttill et al. | 249—172X |
| 1,642,947 | 9/1927 | Fischer | 249—172 |
| 3,192,561 | 7/1965 | Archer et al. | 18—5M |
| 3,304,592 | 2/1967 | Fattirolli | 18—12PX |

J. SPENCER OVERHOLSER Primary Examiner

M. O. SUTTON, Assistant Examiner

U.S. Cl. X.R.

25—41; 249—144